C. H. VEEDER.
FLEXIBLE SHAFT AND METHOD OF MAKING SAME.
APPLICATION FILED FEB. 16, 1921.

1,421,623.

Patented July 4, 1922.

INVENTOR
Curtis Hussey Veeder
BY
Redding Greeley
ATTORNEYS

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

FLEXIBLE SHAFT AND METHOD OF MAKING SAME.

1,421,623. Specification of Letters Patent. Patented July 4, 1922.

Application filed February 16, 1921. Serial No. 445,333.

*To all whom it may concern:*

Be it known that I, CURTIS HUSSEY VEEDER, a citizen of the United States, residing in the city of Hartford, in the State of Connecticut, have invented certain new and useful Improvements in Flexible Shafts and Methods of Making Same, of which the following is a specification, reference being had to the accompanying drawing, forming a part hereof.

This invention relates particularly to the manufacture of coiled wire, flexible shafts, that is flexible shafts which have one or more coils of wire wound closely about a core. The uncoiling or the opening of the coils of such shafts is commonly prevented by the application of solder to the shaft for a short distance from the extremity. As the shaft still retains its cylindrical form driving engagement between the shaft and the coacting member is commonly effected by a solid tip secured to the end of the shaft and provided with a key or spline or slotted at its end. It is the object of this invention to improve the manufacture of such shafts so as to afford greater security against unwinding or separation of the coils than is afforded by the use of solder alone, to facilitate construction, and to produce a shaft which shall not require a solid tip, but shall itself be so formed as to secure driving engagement with the coacting member. In accordance with the invention a cylindrical tube is fitted closely on the coiled wire shaft and the tube and shaft are then swaged into polygonal form (preferably square), whereby additional security against the uncoiling or opening of the coils of the shaft is obtained, and at the same time the end portion of the shaft is given a form which assures driving engagement with the coacting member. Preferably the tube is double the length required for each terminal portion and is slipped upon the shaft to an intermediate point before swaging, so that, after swaging, the shaft and tube can be cut at the middle point of the length of the tube and the two ends of the shaft thus secured at one operation. It is generally desirable to fill with solder the coils of the shaft to be covered before the tube is placed, but the swaging may suffice if the inner as well as the outer coils of wire are distorted so as to prevent uncoiling. The invention will be more fully explained with reference to the accompanying drawing in which it is illustrated and in which—

Figure 1:
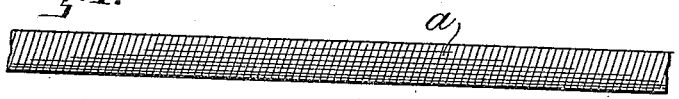
Figure 1 is a view in side elevation of a short length of coiled wire, flexible shaft to be secured against uncoiling.
Figure 2:
Figure 2 is a perspective view of a short length of tube to be employed.
Figure 3:
Figure 3 is a view in side elevation showing the tube applied to the shaft.
Figure 4:
Figure 4 is a view similar to Figure 3, but showing the shaft and tube after swaging.
Figure 5:
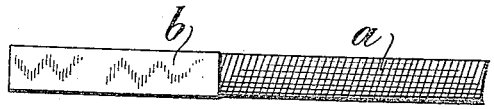
Figure 5 is a view similar to Figure 4, but showing one terminal portion of the shaft after it has been cut.
Figure 6:
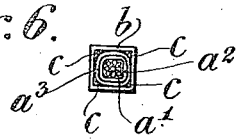
Figure 6 is an end view of the shaft terminal shown in Figure 5.

The coiled wire, flexible shaft $a$ may be of any usual construction, except as to its terminals as hereinafter explained. The shaft is shown in the drawing as having a core $a'$ of longitudinal wires and two concentric coils $a^2$ and $a^3$, wound closely about the core. Such shafting is usually formed in long lengths and is cut off in lengths desired for use, solder being applied to the terminal portions to prevent the uncoiling or opening of the coils. In accordance with the present invention, however, there is provided a sleeve or tube $b$, preferably of sufficient length to form two terminals, and this tube is slipped upon the shafting $a$ to a point where it will cover the cut to be made, the tube fitting the shafting rather closely. When the tube has been placed as desired, the tube and the shafting within it (as far as its construction permits) are swaged to a form polygonal in cross section, preferably square, as shown in Figures 4, 5 and 6, and thereafter the tube and shafting are cut across to form two separate terminals. For the purpose of giving a better body for swaging, and certainly preventing the uncoiling of the inner coils, solder, as indicated at $c$ in Figure 6, may be applied to the shafting where it is to be covered before the tube is slipped into place.

It will be seen that in order to secure driving engagement with the coacting member it is only necessary that the coacting member be formed with a socket to receive the polygonal terminal of the shaft.

I claim as my invention:

1. The improvement in the manufacture of coiled wire flexible shafts which consists in placing on the shafting a closely fitting tube and thereafter swaging the tube and the shafting to polygonal form.

2. The improvement in the manufacture of coiled wire flexible shafts which consists in applying solder to the shafting, then placing on the shafting a closely fitting tube, and finally swaging the tube and the shafting to polygonal form.

3. The improvement in the manufacture of coiled wire flexible shafts which consists in placing on the shafting a closely fitting tube, swaging the tube and the shafting to polygonal form, and finally cutting the tube and shafting at a point between the ends of the tube.

4. As a new article of manufacture, a coiled wire, flexible shaft having upon its end portion a tube swaged upon the shafting together with the shafting itself to polygonal form.

This specification signed this 9th day of February A. D. 1921.

CURTIS HUSSEY VEEDER.